(12) United States Patent
Keller et al.

(10) Patent No.: US 10,591,933 B1
(45) Date of Patent: Mar. 17, 2020

(54) COMPOSABLE PFET FLUIDIC DEVICE

(71) Applicant: Facebook Technologies, LLC, Menlo Park, CA (US)

(72) Inventors: Sean Jason Keller, Kirkland, WA (US); Jack Lindsay, Seattle, WA (US); Serol Turkyilmaz, Redmond, WA (US); Tristan Thomas Trutna, Seattle, WA (US); Andrew Arthur Stanley, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 196 days.

(21) Appl. No.: 15/809,450

(22) Filed: Nov. 10, 2017

(51) Int. Cl.
| | |
|---|---|
| *G05D 7/03* | (2006.01) |
| *F16K 31/126* | (2006.01) |
| *F15C 3/04* | (2006.01) |
| *F16K 7/07* | (2006.01) |
| *F16K 99/00* | (2006.01) |
| *F16K 31/365* | (2006.01) |

(52) U.S. Cl.
CPC .............. *G05D 7/03* (2013.01); *F15C 3/04* (2013.01); *F16K 7/07* (2013.01); *F16K 31/126* (2013.01); *F16K 31/365* (2013.01); *F16K 99/0015* (2013.01); *F16K 99/0061* (2013.01)

(58) Field of Classification Search
CPC .... F16K 7/075; F16K 31/126; F16K 99/0015; F16K 99/0061; F16K 31/365; F16K 7/07; F15C 3/04; G05D 7/03
USPC ............................................................ 251/5
See application file for complete search history.

(56) References Cited

U.S. PATENT DOCUMENTS

| 844,410 A | 2/1907 | Schauer |
| 2,069,261 A | 2/1937 | Georges |
| 2,241,086 A | 5/1941 | Gould |
| 2,345,693 A | 4/1944 | Wilson et al. |
| 2,590,215 A | 3/1952 | Sausa |

(Continued)

FOREIGN PATENT DOCUMENTS

| CH | 522157 A | 4/1972 |
| EP | 2479466 A1 | 7/2012 |

(Continued)

OTHER PUBLICATIONS

European Patent Office, Extended European Search Report, European Patent Application No. 18189238.1, dated Apr. 12, 2019, 9 pages.

(Continued)

*Primary Examiner* — Umashankar Venkatesan
(74) *Attorney, Agent, or Firm* — FisherBroyles, LLP

(57) ABSTRACT

A fluidic device controls fluid flow in channel from a source to a drain. The fluidic device may be combined with other fluidic devices to form different types of logic devices g an inverter, OR gate, etc.). And the logic devices may be incorporated into an artificial reality system (e.g., as part of a haptic assembly). In some embodiments, a fluidic device includes a gate, a channel, and a wedge. The wedge controls a rate of fluid flow within the channel based on a fluid pressure in the gate. The wedge induces a first flow rate of fluid in the channel in accordance with a low pressure state of the gate, and a second flow rate of the fluid in the channel in accordance with a high pressure state of the gate, the second flow rate greater than the first flow rate.

16 Claims, 8 Drawing Sheets

(56) References Cited

U.S. PATENT DOCUMENTS

| | | | |
|---|---|---|---|
| 2,633,154 A | 3/1953 | Eastman | |
| 2,715,009 A | 8/1955 | Beekley | |
| 2,772,066 A * | 11/1956 | Keeton | F16K 31/365 251/46 |
| 3,237,616 A | 3/1966 | Daigh et al. | |
| 3,308,898 A | 3/1967 | Allen et al. | |
| 3,441,245 A | 4/1969 | Holland et al. | |
| 3,468,342 A | 9/1969 | Craft | |
| 3,549,118 A | 12/1970 | Bluder | |
| 3,610,274 A * | 10/1971 | Levesque | F15C 3/04 137/519 |
| 3,695,576 A | 10/1972 | Kane et al. | |
| 3,759,483 A | 9/1973 | Baxter | |
| 3,918,674 A * | 11/1975 | Sutter | F16K 7/07 251/5 |
| 3,936,028 A | 2/1976 | Norton et al. | |
| 3,951,168 A | 4/1976 | Roberts | |
| 4,071,039 A | 1/1978 | Goof | |
| 4,114,144 A * | 9/1978 | Hyman | A61M 5/365 128/DIG. 13 |
| 4,300,748 A | 11/1981 | Kreeley | |
| 4,322,054 A | 3/1982 | Campbell | |
| 4,494,345 A | 1/1985 | Peterson | |
| 4,642,833 A | 2/1987 | Stoltz et al. | |
| 4,662,598 A | 5/1987 | Weingarten | |
| 5,071,411 A | 12/1991 | Hillstead | |
| 5,078,363 A | 1/1992 | Gregory | |
| 5,131,423 A | 7/1992 | Shaw | |
| 5,186,431 A | 2/1993 | Tamari | |
| 5,354,162 A | 10/1994 | Burdea et al. | |
| 5,441,231 A | 8/1995 | Payne et al. | |
| 5,593,290 A | 1/1997 | Greisch et al. | |
| 6,053,191 A | 4/2000 | Hussey | |
| 6,276,661 B1 | 8/2001 | Laird | |
| 6,361,015 B1 | 3/2002 | Warmerdam | |
| 6,406,605 B1 * | 6/2002 | Moles | F15C 5/00 137/833 |
| 6,461,335 B1 | 10/2002 | Noecker | |
| 6,474,623 B1 | 11/2002 | Davies | |
| 6,505,810 B2 | 1/2003 | Abromaitis | |
| 7,703,477 B2 | 4/2010 | Cook et al. | |
| 7,998,121 B2 | 8/2011 | Stringham | |
| 8,034,065 B2 | 10/2011 | Coe et al. | |
| 8,286,933 B2 | 10/2012 | Hanada | |
| 8,585,006 B2 | 11/2013 | Gabelgaard | |
| 8,603,834 B2 | 12/2013 | Puleo et al. | |
| 8,714,514 B2 | 5/2014 | Eijkelenberg et al. | |
| 8,922,355 B2 | 12/2014 | Kusuura | |
| 2002/0158217 A1 | 10/2002 | Inoue et al. | |
| 2002/0169424 A1 | 11/2002 | Miles et al. | |
| 2003/0010946 A1 | 1/2003 | Furukawa et al. | |
| 2003/0141470 A1 | 7/2003 | Igarashi | |
| 2003/0196695 A1 | 10/2003 | O'Connor et al. | |
| 2004/0033108 A1 | 2/2004 | Raftis et al. | |
| 2004/0056220 A1 | 3/2004 | Raftis | |
| 2004/0075069 A1 | 4/2004 | Bartoli et al. | |
| 2006/0058740 A1 | 3/2006 | Cise et al. | |
| 2006/0243934 A1 | 11/2006 | Chung et al. | |
| 2006/0245933 A1 | 11/2006 | Balch et al. | |
| 2007/0170382 A1 | 7/2007 | Li et al. | |
| 2008/0087853 A1 | 4/2008 | Kees | |
| 2008/0264863 A1 | 10/2008 | Quake et al. | |
| 2009/0007969 A1 | 1/2009 | Gundel | |
| 2009/0145502 A1 | 6/2009 | Dirac et al. | |
| 2009/0302244 A1 | 12/2009 | Wedel | |
| 2010/0078584 A1 * | 4/2010 | Van Den Bijgaart | F15C 5/00 251/331 |
| 2010/0093559 A1 | 4/2010 | Fan et al. | |
| 2010/0170572 A1 | 7/2010 | Sahoo et al. | |
| 2010/0180970 A1 | 7/2010 | Welle | |
| 2010/0260617 A1 | 10/2010 | Haertl | |
| 2010/0266980 A1 | 10/2010 | Boyd et al. | |
| 2011/0020140 A1 | 1/2011 | Park et al. | |
| 2011/0045599 A1 | 2/2011 | Erickson et al. | |
| 2012/0039770 A1 | 2/2012 | Namkoong et al. | |
| 2012/0275929 A1 | 11/2012 | Salsman | |
| 2013/0032210 A1 | 2/2013 | Johnstone et al. | |
| 2013/0255815 A1 * | 10/2013 | Brinkmann | F16L 55/02727 138/46 |
| 2013/0343913 A1 | 12/2013 | Joshi et al. | |
| 2014/0130920 A1 | 5/2014 | Fernandes et al. | |
| 2014/0134001 A1 | 5/2014 | Uchida et al. | |
| 2014/0197339 A1 | 7/2014 | Mathies et al. | |
| 2014/0224335 A1 * | 8/2014 | Hofmann | B01J 19/0093 137/1 |
| 2015/0267822 A1 | 9/2015 | Nissen | |
| 2017/0300115 A1 | 10/2017 | Kerr et al. | |
| 2017/0322629 A1 | 11/2017 | Pirasmepulkul et al. | |
| 2018/0003319 A1 | 1/2018 | Besse et al. | |
| 2018/0038513 A1 | 2/2018 | Baldea et al. | |
| 2018/0158367 A1 | 6/2018 | Russomanno et al. | |
| 2018/0161671 A1 | 6/2018 | Heubel | |

FOREIGN PATENT DOCUMENTS

| | | |
|---|---|---|
| EP | 3351839 A2 | 7/2018 |
| KR | 10-2016-0098056 A | 8/2016 |
| WO | WO 89/05417 A1 | 6/1989 |
| WO | WO 2010/104878 A1 | 9/2010 |
| WO | WO 2011/048521 A1 | 4/2011 |
| WO | WO 2016/205143 A1 | 12/2016 |
| WO | WO 2017/147004 A1 | 8/2017 |

OTHER PUBLICATIONS

PCT International Search Report and Written Opinion, PCT Application No. PCT/US2017/064683, dated Mar. 30, 2018, 19 pages.

United States Office Action, U.S. Appl. No. 15/706,578, dated Feb. 25, 2019, 13 pages.

United States Office Action, U.S. Appl. No. 15/683,937, dated Mar. 20, 2019, 15 pages.

United States Office Action, U.S. Appl. No. 15/824,294 dated Mar. 7, 2019, 23 pages.

PCT International Search Report and Written Opinion, PCT Application No. PCT/US2018/046486, dated Jan. 8, 2019, fifteen pages.

European Partial Search Report, European Application No. 18158349.3, dated Sep. 20, 2018, 17 pages.

Mohan, R. et al., "Design Considerations for Elastomeric Normally Closed Microfluidic Valves," Sensors and Actuators B: Chemical: International Journal Devoted to Research and Development of Physical and Chemical Transducers, Sep. 17, 2011, pp. 1216-1223, vol. 160, No. 11.

Perdigones, F.A. et al., "Correspondence Between Electronics and Fluids in MEMS: Designing Microfluidic Systems Using Electronics," IEEE Industrial Electronics Magazine, Dec. 1, 2014, pp. 6-17, vol. 8, No. 4.

PCT International Search Report, PCT Application No. PCT/US2017/052048, dated May 23, 2018, 18 pages.

European Partial Search Report, European Application No. 18151564.4, dated Jul. 17, 2018, 17 pages.

Eddington, D. et al., "Flow Control with Hydrogels," Advanced Drug Delivery Reviews, Feb. 10, 2004, pp. 199-210, vol. 56, No. 2.

Frank, P. et al., "Integrated Microfluidic Membrane Transistor Utilizing Chemical Information for On-Chip Flow Control," PLOS One, Aug. 29, 2016, e0161024, 17 pages, vol. 11, No. 8.

Yu, Q. et al., "Responsive Biomimetic Hydrogel Valve for Microfluidics," Applied Physics Letters, Apr. 23, 2001, pp. 2589-2591, vol. 78, No. 17.

Devaraju, N.S.G.K. et al., "Pressure Driven Digital Logic in PDMS Based Microfluidic Devices Fabricated by Multilayer Soft Lithography," Lab Chip, The Royal Society of Chemistry, 2012, pp. 4809-4815, vol. 12.

* cited by examiner

US 10,591,933 B1

COMPOSABLE PFET FLUIDIC DEVICE

BACKGROUND

The present disclosure generally relates to fluidic devices for head-mounted displays (HMD) and more specifically to fluidic switching devices for use in virtual reality, augmented reality, and/or mixed reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system.

SUMMARY

Embodiments of the disclosed invention include fluidic devices used in artificial reality systems. Fluidic devices are fluid handling devices that function analogous to electronic devices (e.g., an electrical transistor, an electrical diode, a resistor, a capacitor, etc.). For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g. a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state), the gate may restrict the fluid flow in the channel. In alternate embodiments, the flow in the channel is restricted until a threshold pressure (i.e., the high pressure state) in the gate is achieved.

In some embodiments, a fluidic device comprises a gate, a channel, and wedge. The gate is comprised of at least one chamber whose volume expands with fluid pressure within the chamber, causing a volume of the chamber to increase. In some embodiments, a high pressure state of the gate corresponds to a first chamber size. In further embodiments, a low pressure state of the gate corresponds to a second chamber size that is smaller than the first chamber size. The channel is configured to transport a fluid from a source to a drain. The source is an input that fluid enters in the channel. The drain is an output for the fluid in the channel. The wedge controls a rate of fluid flow between the source and the drain in accordance with the fluid pressure in the gate. In some embodiments, the wedge is configured to induce a first flow rate of the fluid in the channel in accordance with the low pressure state of the gate. In further embodiments, the wedge is configured to induce a second flow rate of fluid in the channel in accordance with the high pressure state of the gate, the second flow rate greater than the first flow rate. In some embodiments, such a fluidic device may be incorporated into a haptic device.

Fluidic devices, such as the fluidic device described above, may be composed to create a composite fluidic device. In some embodiments, the composite fluidic device may comprise a first fluidic device coupled to a high pressure rail at a first pressure and a low pressure rail at a second pressure. The second pressure may be less than the first pressure in certain embodiments. The first fluidic device may comprise a first channel and a first gate. The first channel is configured to transport fluid from a first source to a first drain. In some embodiments, the first source is coupled to the high pressure rail and is an input that fluid enters in the channel. The first drain includes an output path for fluid in the first channel. The first gate is configured to modulate a rate of fluid flow in the first channel by reducing a cross section of the first channel in accordance with logic instructions.

In one embodiment, a wearable device is implemented in a system for providing artificial reality experience to a user who wears the device. In more detail, the wearable device provides haptic feedback to the user in response to instructions from a console of the system. The wearable device includes at least one actuator, and a controller. The controller is composed of a plurality of fluidic devices, including at least one fluidic device described herein. In some embodiments, the fluidic devices are coupled together to form one or more composite fluidic devices. For example, a composite device may be a decoder that is used to address the at least one actuator.

Figure 1:
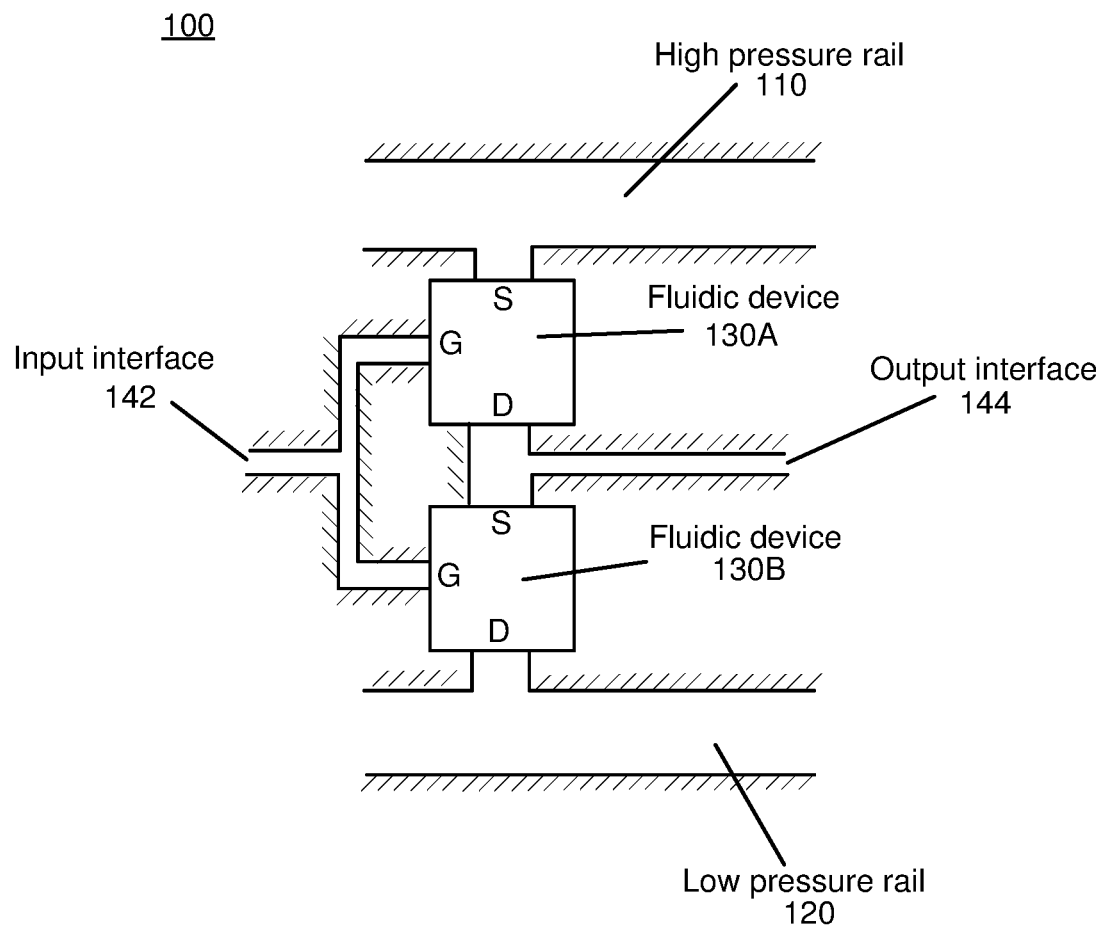
FIG. 1 is an example diagram of a composite fluidic device, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Fluidic devices are fluid handling devices that function analogous to electronic devices (e.g., an electrical transistor, an electrical diode, a resistor, a capacitor, etc.). Tiny fluid (e.g., liquid or gas) devices are used in artificial reality systems. At a high level, the fluid devices function in a manner similar to conventional electrical transistors such that gate pressure may adjust a flow of a liquid through a channel from a source to a drain. Various embodiments of fluidic devices are discussed in detail below with regard to FIGS. 3A-4B. Additional examples of fluidic devices are found in U.S. Patent Application No. 62/449,323, filed on Jan. 23, 2017, U.S. Patent Application No. 62/452,242, filed on Jan. 30, 2017, U.S. patent application Ser. No. 15/683,937, filed on Aug. 23, 2017, U.S. patent application Ser. No. 15/695,272, filed on Sep. 5, 2017, and U.S. patent application Ser. No. 15/706,578, filed on Sep. 15, 2017, which are hereby incorporated by reference in their entireties.

Additionally, the fluidic devices are "composable," in that a plurality of fluidic devices may be coupled together to generate larger structures. As a fluidic device may be designed to operate as, e.g., a fluidic transistor, multiple fluidic devices can be coupled together to create a composite device that performs certain logical functions in a manner analogous to electrical transistors being used together to form electrical circuits that perform logical functions (e.g., AND gate). Accordingly, a composite fluidic device may perform various logic functions including, e.g., an AND function, a NOT function, a NAND function, an OR function, a NOR function, an exclusive OR function, some other logical function, or some combination thereof. Moreover, multiple composite devices can be coupled together to form even larger fluidic circuits (e.g., a decoder, a controller in a haptic glove, etc.). The composite fluidic device may be structured to perform combination logic, sequential logic, or both, or it may be configured to pass values (e.g. a pass transistor or a pass-gate).

FIG. 1 is an example diagram of a composite fluidic device 100, in accordance with an embodiment. The composite fluidic device 100 includes a high pressure rail 110, a low pressure rail 120, one or more fluidic devices 130A and 130B, an input interface 142 and an output interface 144. The diagram 100 shown in FIG. 1 is merely one example, and in alternative embodiments not shown, the diagram 100 may include additional/fewer or different fluidic devices between the high pressure rail 110 and the high pressure rail 120. Likewise, the various entities of the diagram 100 may differ in different embodiments.

The high pressure rail 110 is a structure that provides a fluid at a fixed pressure. The structure is made out of a material that does not readily deform at this pressure, or in another embodiment it is sufficiently capacitive that deformation does not render the device faulty. For example, the structure may be composed of, e.g., high-durometer polydimethylsiloxane (PDMS) and other polymers. In some embodiments, the structure may be flexible. The structure may have a circular cross section, a rectangular cross section, or some other cross section. Alternatively, the structure may be rigid or semi-rigid. The fixed pressure is relatively constant. In some embodiments, the high pressure rail 110 is connected to a pressurized fluid source, one or more pumps, or some other device that may be used to ensure the fluid in the high pressure rail 110 is at the first pressure. The fluid may be a liquid or a gas. For example, the fluid may be water, deionized water, alcohol, oil, standard hydraulic fluids, air, and nitrogen. The pressure of fluid in the high pressure rail 110 is analogous to a rail voltage for a transistor in an electrical system, such that fluid flows away from the high pressure rail 110 toward areas with lower pressure much in the same way that a rail voltage provide potential for other parts of an electrical circuit. For example, a typical operating pressure of the fluid in the high pressure rail 110 can be 1-100 PSI (pounds per square inch).

The low pressure rail 120 is another structure that transmits the fluid. The low pressure rail 120 provides the fluid at a second pressure that is lower than the first pressure, and is generally at the lowest pressure within the composite fluidic device 100. The structure is made out of a material that does not deform at the first pressure. For example, the structure may be composed of, e.g., high-durometer PDMS, and other polymers. The low pressure rail 120 generally functions as a low pressure zone such that fluid from other parts of the composite fluidic device 100 coupled to the low pressure rail 120 flows toward the low pressure rail 120. The pressure of fluid in the low pressure rail 120 is analogous to an electrical ground in an electrical system. For example, the pressure of the fluid in the low pressure rail 120 can range from high vacuum to 15 PSI. High vacuum may be, e.g., an absolute pressure of $1.45 \times 10^{-5}$ PSI or less. In one embodiment, the upper end of the low pressure rail pressure value can be defined as a difference from the high pressure rail, and in this case it could be, e.g., 5 PSI below the high rail regardless of the absolute pressure value of the high rail.

The fluidic devices 130A, 130B are fluidic devices that function analogous to transistors in electrical systems, for example, a P-channel field-effect transistor (PFET), or an N-channel field-effect transistor (NFET). As shown in FIG. 1, each of the fluidic devices 130A and 130B includes a source, a drain, and a gate. In some embodiments, there is a channel filled with fluid between the source and the drain, and the pressure of the fluid in the source is higher than the pressure of the fluid in the drain, allowing the flow in the channel to flow from the source to drain when the channel is open. In one embodiment, when the gate is at a low pressure state, the channel is open; and when the gate is at a high pressure state, the channel is closed. In another embodiment, when the gate is at a high pressure state, the channel is in an open state; and when the gate is at a low pressure state, the channel is in a closed state.

An "open" state of the channel refers to a state when the fluid in the channel is flowing from one end (e.g., the source) to the other end (e.g., the drain) at some open threshold rate.

For example, the open threshold rate may be 10 cc/s. The measurement "cc/s" used throughout the specification refers to "cubic-cm/sec." In contrast, a "closed" state of the channel refers to the state when the flow of fluid in the channel is less than some closed threshold rate. In some embodiments, the closed threshold rate may be zero flow. Alternatively, the closed threshold rate may be some rate of flow that is lower than the open threshold rate. For example, the closed threshold rate may be 0.1 cc/s. In addition, a "transitionary" state occurs when the channel transitions from an open state to a closed state or from a closed state to an open state. The "open" state of the channel is also referred to as an "ON" condition of a fluidic device, and the "closed" state of the channel is also referred to as an "OFF" condition of a fluidic device.

A "high pressure" and "low pressure" described here depends on the fluidic device structures and pressure of the fluid filling the fluidic device. In general, a "low pressure" is a pressure of the fluid that falls within a low pressure range, and a "high pressure" is a pressure of the fluid that falls within a high pressure range. The low pressure range may be thought of as a "0" and the high pressure range may be thought of as a "1." Accordingly, the fluidic devices 130A, 130B may operate digitally using the fluid at different pressures. Moreover, different components of a fluidic device may have different high pressure ranges and different low pressure ranges. For example, a high pressure range of a gate may be significantly less than a high pressure range of a source. The range of response times for a channel to open or close can be from 0.1 ms to 30 ms.

The input interface 142 is an interface that enables the fluidic devices 130A, 130B to receive inputs. In one embodiment, an input to the fluidic device 130 is fluid at a certain pressure that is applied to certain parts of the fluidic device that can cause the fluidic device to be either an "ON" or "OFF" condition. As one example, the input may be fluid at a certain pressure that is applied to the gates of the fluid devices 130A, 130B. Similarly, the output interface 144 is an interface that enables the fluidic devices 130A, 130B to provide outputs.

FIGS. 2A-D are example diagrams of embodiments of dual rail logic devices. In general, dual rail logic devices comprise one or more logic gates. One advantage of using a dual rail logic device is that the device may use one device style, but can still perform various logic functions including, e.g., an AND function, a NOT function, a NAND function, an OR function, a NOR function, an exclusive OR function, some other logical function, or some combination thereof depending upon the combination of the logic gates that comprise the logic device. For example, the dual rail logic devices depicted in FIGS. 2A-D all use the same type of logic gate, but perform a variety of logic functions as discussed below. Additionally, by using multiple logic gates, low pressure inputs can be easily combined to create amplified, high pressure outputs. This increases the energy efficiency of the circuit. Furthermore, while FIGS. 2A-D expressly depict specific dual rail logic devices comprised of one type of logic gate, alternative dual rail logic devices that are not expressly included herein can be used to perform various logic functions including, e.g., an AND function, a NOT function, a NAND function, an OR function, a NOR function, an exclusive OR function, some other logical function, or some combination thereof.

Logic gates are the fundamental building blocks used to build larger circuit elements such as transistors and resistors. Depending upon the combination and ordering of logic gates used, different transistors and resistors can be built. Typically the medium of the circuits associated with the logic devices depicted in FIGS. 2A-D is electricity. However, in the embodiments of FIG. 2A-D, the medium of the circuits is any type of fluid, and the circuits are composed of fluidic devices. For example, what is represented as a transistor is a fluidic transistor, what is presented as a resister is a fluidic resistor, etc. In other words, just as electronic transistors and resistors can be built using combinations of different electric logic gates, fluidic transistors and resistors can also be built using combinations of different fluidic logic gates.

Note, FIGS. 2A-2D are all composed of a single type of fluidic transistor that includes a gate, a source, and a drain. The fluidic transistors as illustrated in FIGS. 2A-2D have a fluid flow from the drain at a rate that correspond to an "ON" condition of the fluidic device if the fluid pressure at the gate is in a high state. One example of such a fluidic transistor is discussed below with regard to FIGS. 3A-3C. It should be noted that such logic devices may also be based on fluidic transistors that have a fluid flow from the drain at a rate that correspond to "ON" condition of the fluidic device if the fluid pressure at the gate is in a low state. One example of such a fluidic transistor is discussed below with regard to FIGS. 4A-B.

Figure 2A:
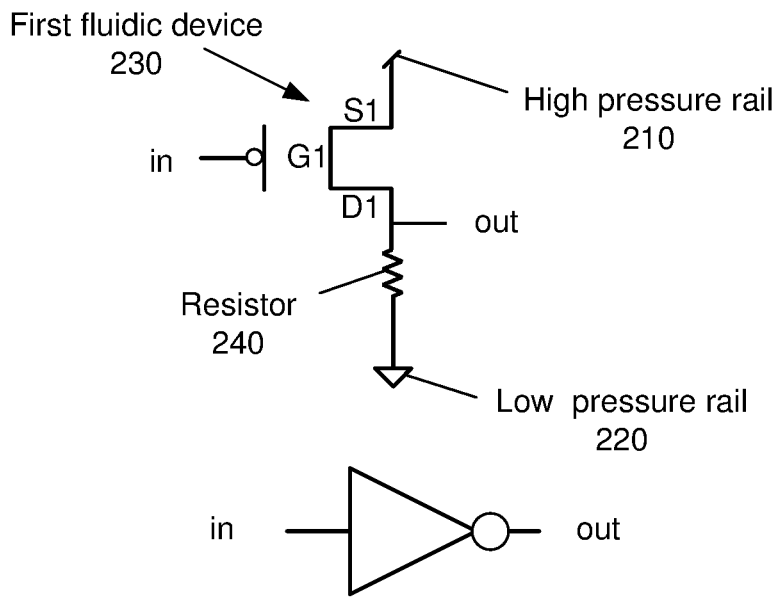
FIG. 2A is an example diagram a dual rail logic device configured to perform a NOT function, according to an embodiment.

FIG. 2A is an example diagram 200A of a dual rail logic device configured to perform a NOT function, according to an embodiment. The dual rail logic device depicted in FIG. 2A comprises a high pressure rail 210, a low pressure rail 220, a first fluidic device 230, and a resistor 240.

The first fluidic device 230 is coupled to a high pressure rail 210 at a first pressure and to a low pressure rail 220 at a second pressure, and the second pressure is less than the first pressure. The first fluidic device 230 comprises a first channel and a first gate (e.g., G1). The first channel is configured to transport a fluid from a first source (e.g., S1) to a first drain (e.g., D1). The first source is coupled to the high pressure rail 210 and is an input that fluid enters in the channel. The first drain includes an output path for fluid in the first channel. The first gate is configured to modulate a rate of fluid flow in the first channel by reducing a cross section of the first channel in accordance with logic instructions. The modulation of the rate of fluid flow in the first channel is dependent upon the configuration of the first gate as discussed in greater detail below. In some embodiments, the first fluidic device 230 is the fluidic device described below with regard to FIGS. 3A-4B. Additional examples of fluidic devices that may be the first fluidic device 230 are found in U.S. Patent Application No. 62/449,323, filed on Jan. 23, 2017, U.S. Patent Application No. 62/452,242, filed on Jan. 30, 2017, U.S. patent application Ser. No. 15/683,937, filed on Aug. 23, 2017, U.S. patent application Ser. No. 15/695,272, filed on Sep. 5, 2017, and U.S. patent application Ser. No. 15/706,578, filed on Sep. 15, 2017, which are hereby incorporated by reference in their entireties.

The dual rail logic device of FIG. 2A further comprises one or more fluidic resistors. For example, FIG. 2A comprises a fluidic resistor 240. The fluidic resistor 240 comprises an input terminal and an output terminal. The input terminal of the fluidic resistor 240 is coupled to the first drain of the first fluidic device 230. The output terminal of the fluidic resistor 240 is coupled to the low pressure rail 220. The fluidic resistor 240 is configured to slow a rate of fluid flow between the input terminal and the output terminal of the fluidic resistor 240.

The dual rail logic device depicted in FIG. 2A is configured to perform a NOT function. The first fluidic device 230 is configured such that the first fluidic device 230 is "ON" while a fluidic pressure in the first gate of the first fluidic device 230 is low. In other words, the dual rail logic device depicted in FIG. 2A is functionally an inverter. This means that for a first pressure state of the first gate, a fluid pressure at the output terminal of the fluidic resistor 240 is higher than a fluid pressure at the output terminal for a second pressure state of the first gate, given that the second pressure state is more than the first pressure state.

Figure 2B:
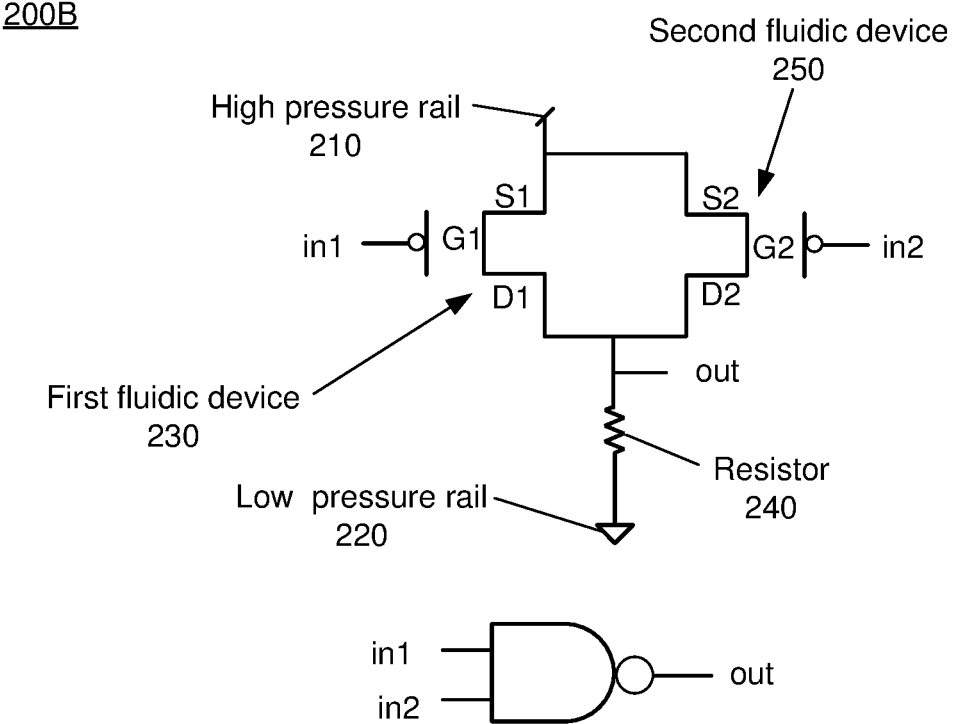
FIG. 2B is an example diagram a dual rail logic device configured to perform a NAND function, according to an embodiment.

FIG. 2B is an example diagram 200B of a dual rail logic device configured to perform a NAND function, according to an embodiment. The dual rail logic device depicted in FIG. 2B comprises the high pressure rail 210, the low pressure rail 220, the first fluidic device 230, and the resistor 240 of FIG. 2A. Additionally, the dual rail logic device depicted in FIG. 2B comprises a second fluidic device 250. The second fluidic device is substantially the same as the first fluidic device 230. In the embodiment depicted in FIG. 2B, the first fluidic device 230 and the second fluidic device 250 both use the same type of logic gate.

The second fluidic device 250 comprises a second channel and a second gate (e.g., G2). Similar to the first channel, the second channel is configured to transport fluid from a second source (e.g., S2) to a second drain (e.g., D2). The second source is an input that fluid enters the second channel. In some embodiments, such as the embodiment shown in FIG. 2B, the second source is coupled to the high pressure rail 210. The second drain includes an output path for fluid in the second channel. In some embodiments, the first drain and the second drain are coupled to the input terminal of the fluidic resistor 240. Similar to the first gate, the second gate is configured to modulate a rate of fluid flow in the second channel by reducing a cross section of the second channel in accordance with logic instructions of the first gate. The modulation of the rate of fluid flow in the second channel is also dependent upon the configuration of the second gate as discussed in greater detail below.

The dual rail logic device depicted in FIG. 2B is configured to perform a NAND function. The first fluidic device 230 and the second fluidic device 250 are configured such that the first fluidic device 230 is "ON" while a fluidic pressure in the first gate of the first fluidic device 230 is low and such that the second fluidic device 250 is "ON" while a fluidic pressure in the second gate of the second fluidic device 250 is low.

Figure 2C:
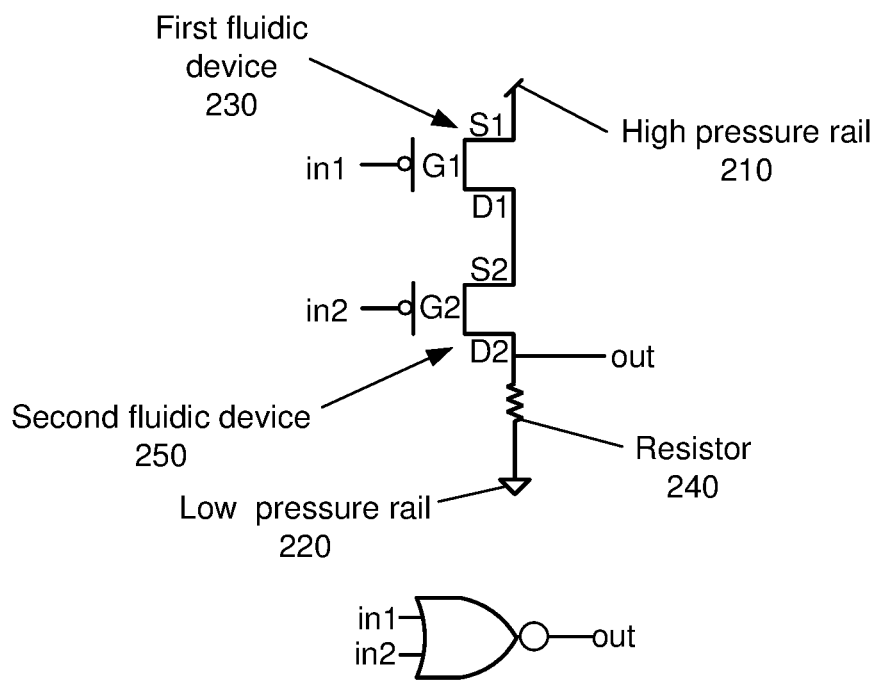
FIG. 2C is an example diagram a two input dual rail logic device configured to perform a NOR function, according to an embodiment.

FIG. 2C is an example diagram 200C of a two input dual rail logic device configured to perform a NOR function, according to an embodiment. The two input dual rail logic device depicted in FIG. 2C comprises the high pressure rail 210, the low pressure rail 220, the first fluidic device 230, the resistor 240, and the second fluidic device 250. As discussed with regard to FIG. 2B, the first fluidic device 230 and the second fluidic device 250 both use the same type of logic gate. However the first fluidic device 230 and the second fluidic device 250 are arranged differently in FIG. 2C than in FIG. 2B, and as a result, the function performed by the dual rail fluidic device of FIG. 2C is different than the function performed by the dual rail fluidic device of FIG. 2B. Specifically, as seen in FIG. 2C, the first drain of the first fluidic device 230 is coupled to the second source of the second fluidic device 250, and the second drain of the second fluidic device 250 is coupled to the input terminal of the fluidic resistor 240.

The dual rail logic device depicted in FIG. 2C is configured to perform a NOR function. The first fluidic device 230 and the second fluidic device 250 are configured such that the first fluidic device 230 is "ON" while a fluidic pressure in the first gate of the first fluidic device 230 is low and such that the second fluidic device 250 is "ON" while a fluidic pressure in the second gate of the second fluidic device 250 is low.

Figure 2D:
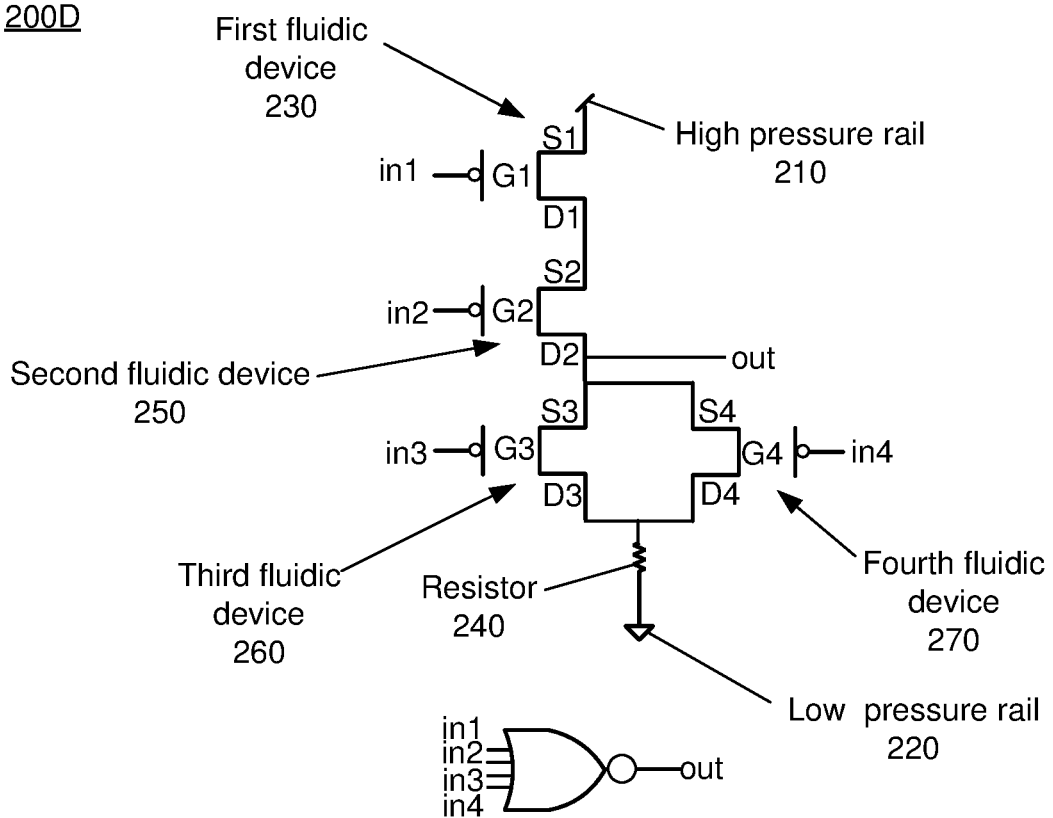
FIG. 2D is an example diagram a four input dual rail logic device configured to perform a NOR function, according to an embodiment.

FIG. 2D is an example diagram 200D of a four input dual rail logic device configured to perform a NOR function, according to an embodiment. The four input dual rail logic device depicted in FIG. 2D comprises the high pressure rail 210, the low pressure rail 220, the first fluidic device 230, and the resistor 240, and the second fluidic device 250. Additionally, the four input dual rail logic device depicted in FIG. 2D comprises a third fluidic device 260 and a fourth fluidic device 270, both of which are substantially the same as the first fluidic device 230.

The third fluidic device 260 comprises a third channel and a third gate (e.g., G3). The third channel is configured to transport fluid from a third source (e.g., S3) to a third drain (e.g., D3). The third source is an input that fluid enters the third channel. The third drain includes an output path for fluid in the third channel. The third gate is configured to modulate a rate of fluid flow in the third channel by reducing a cross section of the third channel in accordance with logic instructions of the first gate and the second gate. The modulation of the rate of fluid flow in the third channel is also dependent upon the configuration of the third gate as discussed in greater detail below.

The fourth fluidic device 270 comprises a fourth channel and a fourth gate (e.g., G4). The fourth channel is configured to transport fluid from a fourth source (e.g., S4) to a fourth drain (e.g., D4). The fourth source is an input that fluid enters the fourth channel. The fourth drain includes an output path for fluid in the fourth channel. The fourth gate is configured to modulate a rate of fluid flow in the fourth channel by reducing a cross section of the fourth channel in accordance with logic instructions of the first gate, the second gate, and the third gate. The modulation of the rate of fluid flow in the fourth channel is also dependent upon the configuration of the fourth gate as discussed in greater detail below.

In the four input dual rail logic device depicted in FIG. 2D, the first drain is coupled to the second source, the second drain is coupled to the third source and the fourth source, and the third drain and the fourth drain are coupled to the input terminal of the fluidic resistor 240.

The four input dual rail logic device depicted in FIG. 2D is configured to perform a NOR function. The first fluidic device 230, the second fluidic device 250, the third fluidic device 260, and the fourth fluidic device 270 are configured such that the first fluidic device 230 is "ON" while a fluidic pressure in the first gate of the first fluidic device 230 is low, such that the second fluidic device 250 is "ON" while a fluidic pressure in the second gate of the second fluidic device 250 is low, such that the third fluidic device 260 is "ON" while a fluidic pressure in the third gate of the third fluidic device 260 is low, and such that the fourth fluidic device 270 is "ON" while a fluidic pressure in the fourth gate of the fourth fluidic device 270 is low.

Figure 3A:
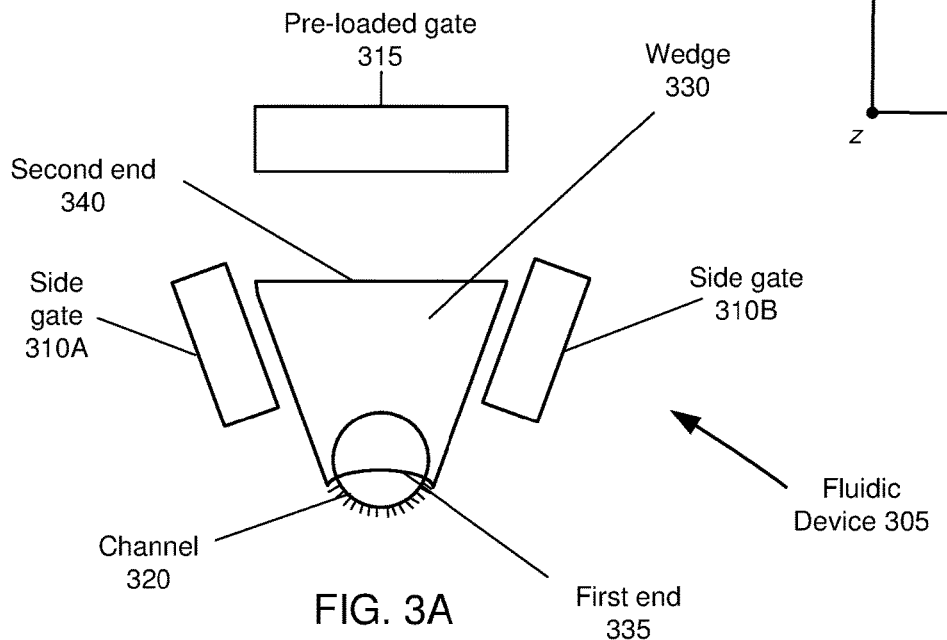
FIG. 3A is a cross section of a fluidic device including side gates and a wedge, the side gates at a low pressure state, in accordance with an embodiment.

FIG. 3A is a cross section 300 of a fluidic device 305 including side gates 310A and 310B and a wedge 330, the gates 310A and 310B at a low pressure state, in accordance with an embodiment. The fluidic device 305 also includes a channel 320 that receives fluid flowing from a source (not shown) and outputs the fluid to a drain (not shown). The side gates 310A and 310B serve to displace the wedge 330 such that the wedge 330 is able to regulate fluid flow through the channel 320. The fluidic device 305 also includes a pre-loaded gate 315. The pre-loaded gate 315 is configured to control the magnitude of displacement of the wedge 330. In some embodiments, the fluidic device 305 is the fluidic device 130A or 130B shown in FIG. 1. In one embodiment, the source, the drain, and the side gates 310A and 310B function analogous to the source, drain, and gates in a field effect transistor in an electrical system.

The channel 320 is a structure that connects two ends that are referred to as the source and the drain, and the channel 320 is filled with a fluid (e.g., liquid or gas). In one embodiment, the channel 320 can be a flexible tube filled with fluid. The channel 320 may have different types of shapes, sizes and/or be made from different materials. As one example, the cross section of the channel 320 may be circular, elliptical, square, rectangular, etc. The channel 320 may be composed of materials such as silicone (a type of elastomer), plastic, etc., and example materials used are polymers such as PDMS. The size can range from 50 um to 5 mm.

The wedge 330 is positioned within the channel 320 between the source and the drain such that the wedge 330 at least partially obstructs (and in some embodiments completely blocks) fluid flow between the source and the drain. Specifically, the wedge 330 protrudes through an opening of the channel 320, into the channel 320. The wedge 330 is able to translate along the y-axis within the opening of the channel 320 such that the distance that the wedge 330 protrudes into the channel 320 can be increased or decreased. The wedge 330 fits within the opening of the channel 320 such that fluid within the channel 320 is unable to escape through the opening.

The wedge 330 may have different types of shapes, sizes and/or be made from different materials. For instance, the wedge 330 may be composed of materials such as silicone (a type of elastomer), plastic, etc., and example materials used are polymers such as PDMS. In the embodiment depicted in FIGS. 3A-C, the wedge 330 comprises a first end 335 and a second end 340. The first end 335 is located adjacent to the channel 320 and the second end 340 is located adjacent to the pre-loaded gate 315. In some embodiments, such as the embodiment shown in FIGS. 3A-C, a width (in the x axis) of the wedge 330 is tapered such that a width (in the x axis) of the first end 335 is less than a width (in the x axis) of the second end 340. In further embodiments, the width of the first end 335 is greater than a diameter of the channel 320 such that the width of the first end 335 is able to extend across the diameter of the channel 320.

The side gates 310A and 310B are a part of the fluidic device 305 and function analogous to gates of an electronic transistor in an electrical system. The side gates 310A and 310B are located outside of the channel 320 on either lateral side of the channel 320 and above the channel 320. As seen in FIG. 3A, in some embodiments, the side gates 310A and 310B are positioned such that a space exists between the side gates 310A and 310B and the wedge 330. The side gates 310A and 310B are also located such that at least a portion of each of the side gates 310A and 310B is located directly beneath at least a portion of the wedge 330. Thus the location of the side gates 310A and 310B may depend on the shape and dimensions of the wedge 330.

Each side gate 310A and 310B comprises a chamber whose volume expands with fluid pressure within the chamber, causing a volume of the chamber to increase. In other words, each side gate 310A and 310B may be inflated by input of fluid and/or may be deflated by output of fluid. For simplicity, the input and output of the side gates 310A and 310B are not shown in FIG. 3A. In some embodiments, the input to the side gates 310A and 310B may be from some other fluidic device. Likewise, in some embodiments, the output of the side gates 310A and 310B may be coupled to other fluidic devices. The side gates 310A and 310B may have different shapes, sizes and/or may be made from different materials. As one example, the cross section of the side gates 310A and 310B may be circular, elliptical, square, rectangular, etc. In some embodiments, the side gates 310A and 310B are made of a flexible and extensible material such that the side gates 310A and 310B may be inflated by increasing the pressure of fluid within the side gates 310A and 310B. For instance, the side gates 310A and 310B may be composed of materials such as silicone (a type of elastomer), plastic, etc., and example materials used are polymers such as PDMS. Similarly, the side gates 310A and 310B may be deflated by decreasing the pressure of fluid within the side gates 310A and 310B. As discussed in further detail below, a high pressure state of the side gates 310A and 310B corresponds to a first chamber size, and a low pressure state of the side gates 310A and 310B corresponds to a second chamber size that is smaller than the first chamber size. In certain embodiments, expansion of the side gates 310A and 310B may be restricted on one or more sides of the side gates 310A and 310B to promote expansion of the side gates 310A and 310B in a specific direction. For example in one embodiment, expansion of the side gates 310A and 310B may be restricted on certain sides such that the side gates 310A and 310B preferentially expand along the x-axis in the direction of the wedge 330 and along the y-axis in the direction of the pre-loaded gate 315.

The pre-loaded gate 315 is located above the wedge 330. Specifically, the pre-loaded gate 315 has a greater y-coordinate value than the wedge 330. In some embodiments, the position of the pre-loaded gate 315 inside the fluidic device 305 is fixed relative to the fluidic device 305 itself, such that the pre-loaded gate 315 restricts movement of the wedge 330 in the positive y-direction. In some embodiments, the pre-loaded gate 315 is made out of a material that has a high resistance to stretch such that it at least has a higher resistance to stretch than the base materials (e.g., underlying substrate) of the fluidic device 305. For example, a stiffness of the pre-loaded gate 315 is at least 10 times as stiff as the base materials. The pre-loaded gate 315 may be, e.g., a stiff fabric, a plastic, a stiff elastomer, a glass, a rigid material with a ratio of stiffness of the base material that is 10 to 100 times that of the base material, or some combination thereof.

Figure 3B:
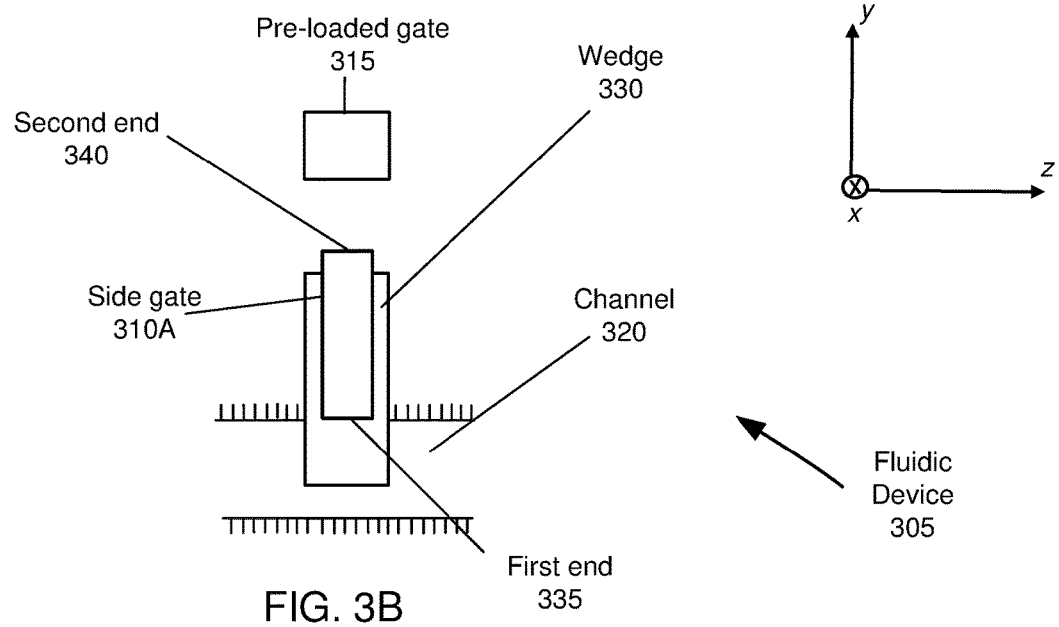
FIG. 3B is a side view of the fluidic device shown in FIG. 3A, in accordance with an embodiment.
Figure 3C:
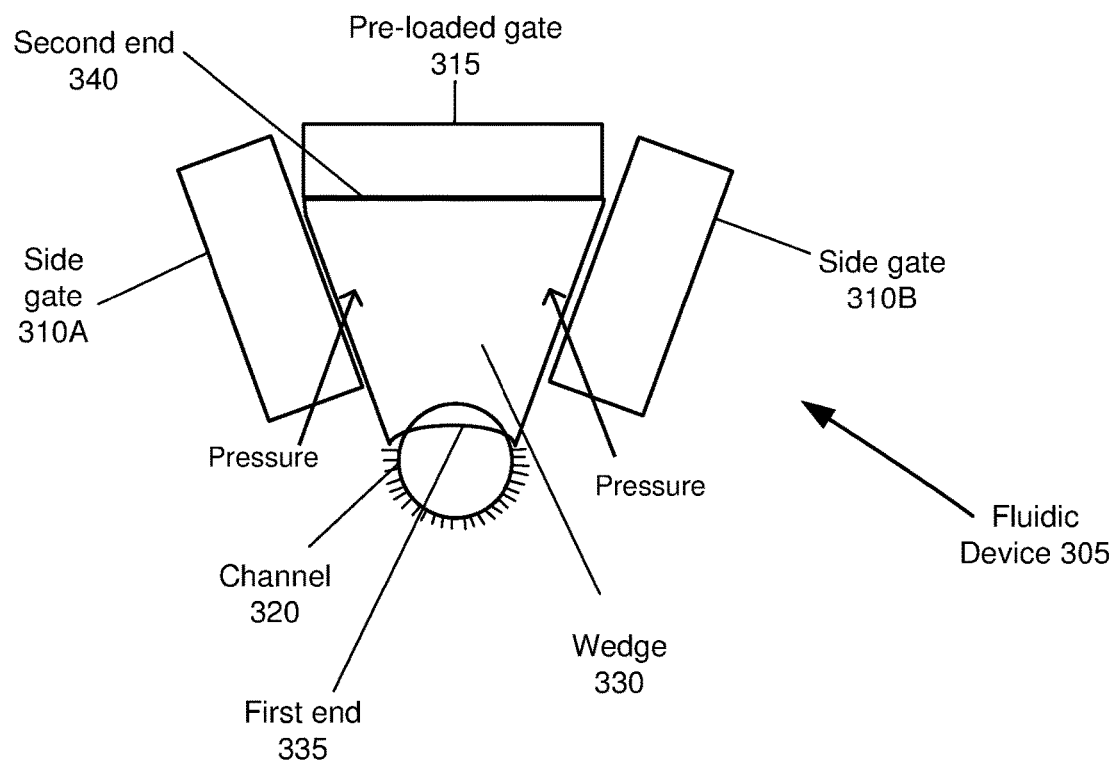
FIG. 3C is a cross section of the fluidic device of FIG. 3A with the side gates at a high pressure state, in accordance with an embodiment.

The pre-loaded gate 315 can have shapes or compositions. As one example, as shown in FIGS. 3A-C, the pre-loaded gate 315 is a rectangular-shaped element. The distance between the pre-loaded gate 315 and the wedge 330 may vary in different embodiments to achieve different effects of control of the movement of the wedge 330 in the positive y-direction. For example, the distance between the pre-loaded gate 315 and the wedge 330 may be greater to allow the wedge 330 to move a greater distance in the positive y-direction compared with a smaller distance between the pre-loaded gate 315 and the wedge 330 in another embodiment. In alternative embodiments, the distance between the pre-loaded gate 315 and the wedge 330 may be zero, such that the pre-loaded gate 315 is continuously in contact with the wedge 330. This may prevent the wedge 330 from shifting its position if the fluidic device 305 moves.

As shown in FIG. 3A, while the side gates 310A and 310B are in a low pressure state, they are deflated. As a result, the wedge 330 protrudes into the channel 320 such that fluid flow through the channel 320 is at a closed threshold rate such that the fluidic device 305 is in an "OFF" condition.

FIG. 3B is a side view 325 of the fluidic device 305 shown in FIG. 3A, in accordance with an embodiment. As shown in FIG. 3B, while the side gates 310A and 310B are in a low pressure state, they are deflated. As a result, the wedge 330 protrudes into the channel 320 such that fluid flow through the channel 320 is at a closed threshold rate such that the fluidic device 305 is in an "OFF" condition.

FIG. 3C is a cross section 350 of the fluidic device 305 of FIG. 3A with the side gates 310A and 310B at a high pressure state, in accordance with an embodiment. In FIG. 3C, the fluid pressure within the side gates 310A and 310B is such that the side gates 310A and 310B have inflated to exert pressure on the wedge 330, effectively lifting the wedge 330 at least partially out of the channel 320 such that the distance that the wedge 330 protrudes into the channel 320 is decreased. This lifting of the wedge 330 out of the channel 320 creates a path for fluid flow through the channel 320 and increases the flow rate in the channel 320 to an open threshold rate such that the fluidic device 305 is in an "ON" condition. The pre-loaded gate 315 is positioned to control the distance that the wedge 330 can be lifted out of the channel 320.

The fluidic device 305 transits from a closed state (FIG. 3A-B) to an open state (FIG. 3C) by increasing fluid pressure at the side gates 310A and 310B. During a transitionary period (not shown), the side gates 310A and 310B gradually expand (with increasing pressure) to lift the wedge 330 at least partially out of the channel 320, and the channel 320 is gradually unblocked such that the rate of fluid flow through the channel 320 is gradually increased. When the fluid flow reaches an open threshold value, the fluidic device 305 is in an "ON" condition.

In alternative embodiments not shown in FIGS. 3A-3C, the side gates 310A and 310B may not have a flexible shape that can expand or shrink with the different fluid pressure applied within the side gates 310A and 310B. In this case, instead of expanding to open the channel 320, extra pressure from outside the side gates 310A and 310B may be applied to the side gates 310A and 310B to make the side gates 310A and 310B move towards and lift the wedge 330, causing the channel 320 to be opened. For example, co-casted materials may be placed around the side gates 310A and 310B such that the side gates 310A and 310B substantially deform only in the direction of the wedge 330. Co-casted materials and their use in fluidic devices is further described in U.S. patent application Ser. No. 15/706,578, filed on Sep. 15, 2017, which is hereby incorporated by reference in its entirety.

Figure 4A:
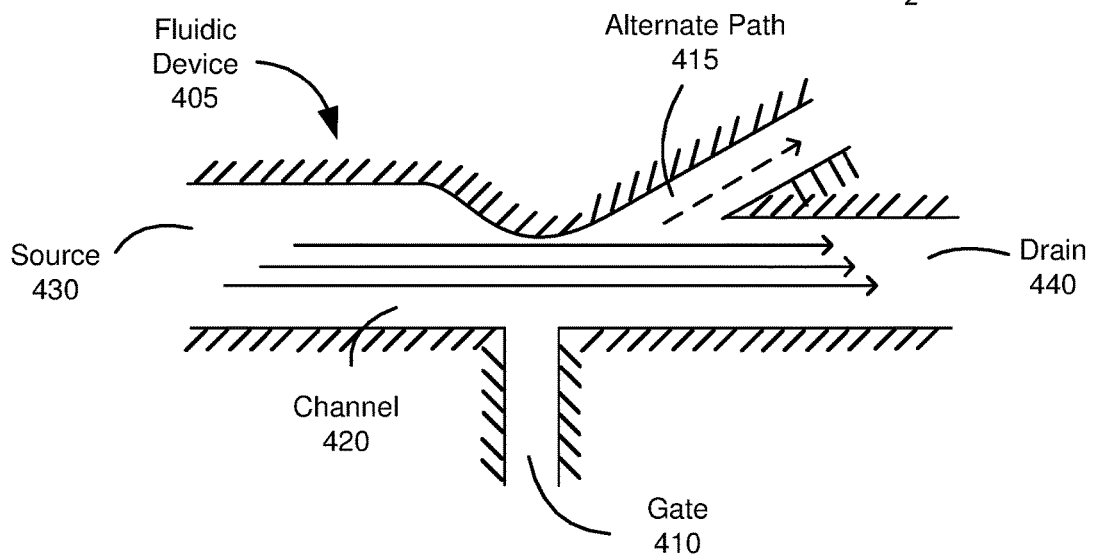
FIG. 4A is a cross section of a jet deflection amplifying fluidic device including a gate at a low pressure state, in accordance with an embodiment.
Figure 4B:
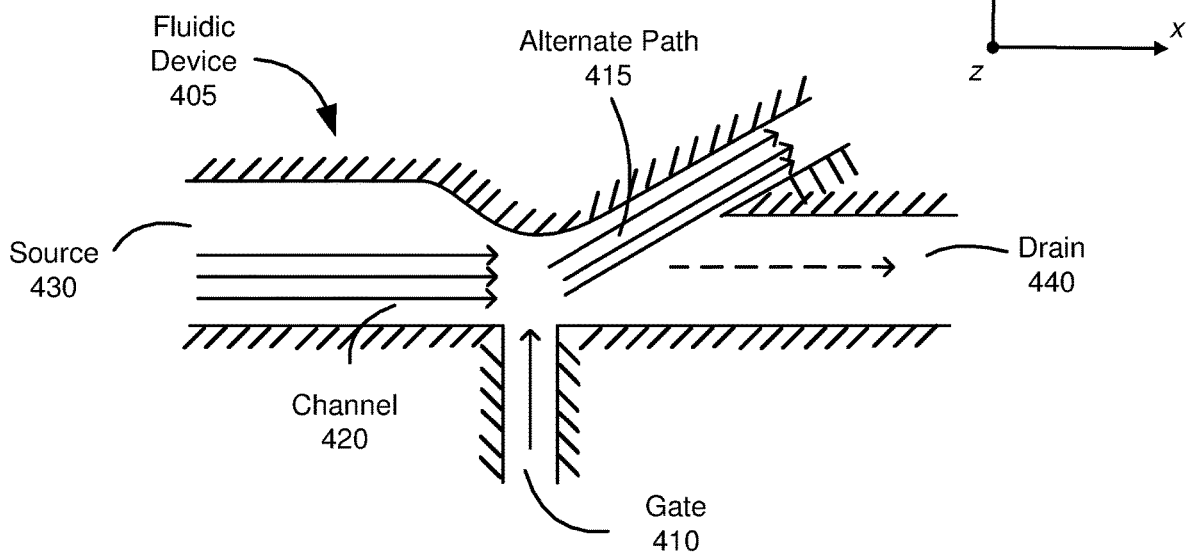
FIG. 4B is a cross section of the fluidic device shown in FIG. 4A, with the gate at a high pressure state, in accordance with an embodiment.

FIG. 4A is a cross section 400 of a jet deflection amplifying fluidic device 405 including a gate 410 at a low pressure state, in accordance with an embodiment. The fluidic device 405 includes the gate 410, and a channel 420 that receives fluid flowing from a source 430 and outputs the fluid to a drain 440. As seen in FIGS. 4A and 4B, the gate 410 is connected to the channel 420 such that fluid may flow from the gate 410 into the channel 420. In addition to the gate 410, an alternate path 415 is also connected to the channel 420 such that fluid may flow between the channel 420 and the alternate path 415. In some embodiments, the fluidic device 405 is the fluidic device 130A or 130B shown in FIG. 1. In one embodiment, the source 430, the drain 440 and the gate 410 function analogous to the source, drain and gate in a field effect transistor in an electrical system.

The channel 420 is a structure that connects two ends that are referred to as the source 430 and the drain 440, and the channel 420 is filled with a fluid (e.g., liquid or gas). In one embodiment, the channel 420 can be a flexible tube filled with fluid. The channel 420 may have different types of shapes, sizes and/or be made from different materials. As one example, the cross section of the channel 420 may be circular, elliptical, square, rectangular, etc. The channel 420 may be composed of materials such as silicone (a type of elastomer), plastic, etc., and example materials used are polymers such as PDMS. The size can range from 50 um to 5 mm.

The gate 410 is a part of the fluidic device 405 and functions analogous to a gate of an electronic transistor in an electrical system. As noted above, the gate 410 is connected to the channel 420 such that fluid can flow from the gate 410 into the channel 420. For simplicity, the input of the gate 410 is not shown in FIGS. 4A and 4B. In some embodiments, the input to the gate 410 may receive fluid from some other fluidic device. In one embodiment, the gate 410 can be a flexible tube filled with fluid. The gate 410 may have different types of shapes, sizes and/or be made from different materials. As one example, the cross section of the gate 410 may be circular, elliptical, square, rectangular, etc. The gate 410 may be composed of materials such as silicone (a type of elastomer), plastic, etc., and example materials used are polymers such as PDMS. In the embodiment shown in FIGS. 4A and 4B, the gate 410 is connected to the channel 420 at a 90 degree angle such that fluid from the gate 410 flows into the channel 420 perpendicular to the direction of fluid flow in the channel 420. However, in alternative embodiments, the gate 410 may be connected to the channel 420 at a range of angles.

The alternate path 415 is a part of the fluidic device 405 that is also connected to the channel 420 such that fluid can flow from the channel 420 into the alternate path 415. For simplicity, the output of the alternate path 415 is not shown in FIGS. 4A and 4B. In some embodiments, the output of the alternate path 415 may receive fluid from some other fluidic device. In one embodiment, the alternate path 415 can be a flexible tube filled with fluid. The alternate path 415 may have different types of shapes, sizes and/or be made from different materials. As one example, the cross section of the alternate path 415 may be circular, elliptical, square, rectangular, etc. The alternate path 415 may be composed of materials such as silicone (a type of elastomer), plastic, etc., and example materials used are polymers such as PDMS. The alternate path 415 is located downstream of the gate 410 (i.e. closer to the drain 440) on a side of the channel 420 that is opposite the gate 410. Furthermore, the alternate path 415 is connected to the channel 420 at an angle such that the combined volume of fluid from the gate 410 and the channel 420 can be redirected into the alternate path 415.

As shown in FIG. 4A, when the gate 410 is in a low pressure state, there is no fluid flow between the gate 410 and the channel 420. Because there is no fluid flow from the gate 410 to the channel 420, fluid is able to flow unhindered from the source 430 to the drain 440 at an open threshold rate such that the fluidic device is in an "ON" condition. Note that a relatively small amount of fluid may flow from the channel 420 to the alternate path 415, but this amount of fluid is negligible compared to the amount of fluid that flows into the drain 440.

FIG. 4B is a cross section 450 of the fluidic device 405 shown in FIG. 4A, with the gate 410 at a high pressure state, in accordance with an embodiment. The fluidic device 405 transits from an open state (FIG. 4A) to a closed state (FIG. 4B) by increasing fluid pressure at the gate 410. During a transitory period (not shown), fluid pressure within the gate 410 is gradually increased causing fluid flow from the gate 410 into the channel 420 to increase. This results in fluid within the channel 420 being redirected to the alternate path

415. Specifically, fluid from the gate 410 enters the channel 420 at an orientation that is perpendicular to the fluid flowing through the channel 420. The velocity of the fluid flowing from the gate 410 and of the velocity of the fluid flowing through the channel 420 can be combined, and result in an average velocity that is directed to the alternate path 415. Thus fluid originating from both the source 430 and from the gate 410 flows into the alternate path 415. This redirection of fluid to the alternate path 415 effectively blocks fluid flow into the drain 440 such that flow is at a closed threshold rate and such that the fluidic device 405 is in an "OFF" condition. Note that a relatively small amount of fluid may flow to the drain 440, but this amount of fluid is negligible compared to the amount of fluid that flows into the alternate path 415. The jet deflection amplifying fluidic device 405 is further described in U.S. patent application Ser. No. 15/683,937, filed on Aug. 23, 2017, which is hereby incorporated by reference in its entirety.

Figure 5:
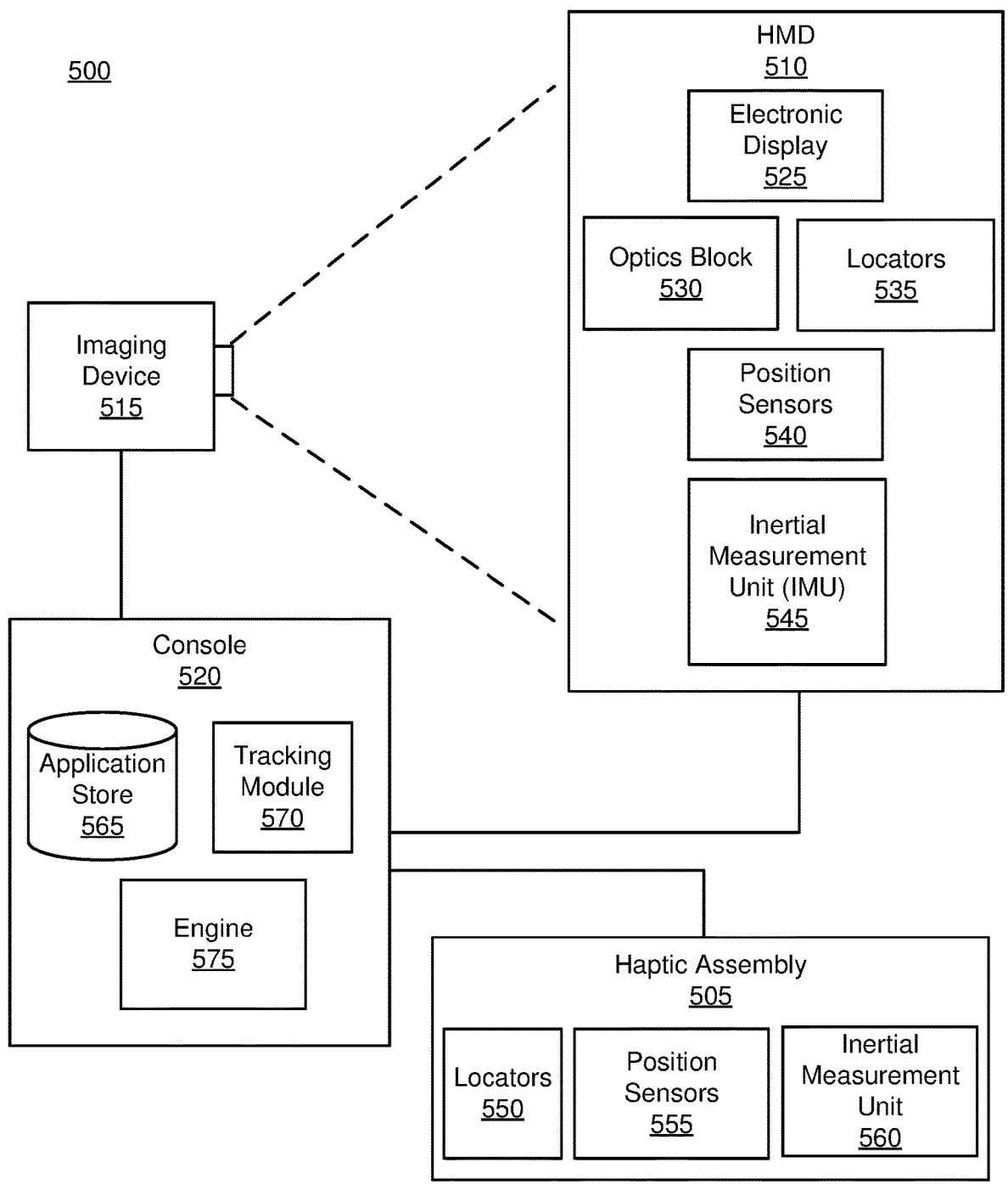
FIG. 5 is a block diagram of a head-mounted device (HMD) system, in accordance with one embodiment.

FIG. 5 is a block diagram of a head-mounted device (HMD) system 500, in accordance with one embodiment. The system 500 may be for use as an artificial reality system. The system 500 may utilize one or more of the example fluidic devices depicted in FIGS. 3A-4B and/or some other form of fluidic device. The system 500 shown by FIG. 5 comprises a HMD 510, an imaging device 515, and a haptic assembly 505 that are each coupled to a console 520. While FIG. 5 shows an example system 500 including one HMD 510, one imaging device 515, and one haptic assembly 505, in other embodiments any number of these components may be included in the system 500. For example, there may be multiple HMDs 510 each having an associated haptic assembly 505 and being monitored by one or more imaging devices 515, with each HMD 510, haptic assembly 505, and imaging devices 515 communicating with the console 520. In alternative configurations, different and/or additional components may be included in the system environment 500. Additionally, in some embodiments the VR system 500 may be modified to include other system environments, such as an AR system environment.

The HMD 510 may act as an artificial reality HMD. The HMD 510 presents content to a user. Examples of media presented by the HMD 510 include one or more images, video, audio, or some combination thereof. In some embodiments, audio is presented via an external device (e.g., speakers and/or headphones) that receives audio information from the HMD 510, the console 520, or both, and presents audio data based on the audio information. The HMD 510 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. The HMD 510 includes an electronic display 525, an optics block 530, one or more locators 535, one or more position sensors 540, and an inertial measurement unit (IMU) 545.

The electronic display 525 displays 2D or 3D images to the user in accordance with data received from the console 520. In various embodiments, the electronic display 525 comprises a single electronic display element or multiple electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 530 magnifies received light from the electronic display 525, corrects optical errors associated with the image light, and the corrected image light is presented to a user of the HMD 510. An optical element may be an aperture, a Fresnel lens, a convex lens, a concave lens, a filter, or any other suitable optical element that affects the image light emitted from the electronic display 525. Moreover, the optics block 530 may include combinations of different optical elements. In some embodiments, one or more of the optical elements in the optics block 530 may have one or more coatings, such as anti-reflective coatings.

The locators 535 are objects located in specific positions on the HMD 510 relative to one another and relative to a specific reference point on the HMD 510. A locator 535 may be a light emitting diode (LED), a corner cube reflector, a reflective marker, a type of light source that contrasts with an environment in which the HMD 510 operates, or some combination thereof. In embodiments where the locators 535 are active (i.e., an LED or other type of light emitting device), the locators 535 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 535 are located beneath an outer surface of the HMD 510, which is transparent to the wavelengths of light emitted or reflected by the locators 535 or is thin enough to not substantially attenuate the wavelengths of light emitted or reflected by the locators 535. Additionally, in some embodiments, the outer surface or other portions of the HMD 510 are opaque in the visible band of wavelengths of light. Thus, the locators 535 may emit light in the IR band under an outer surface that is transparent in the IR band but opaque in the visible band.

The IMU 545 is an electronic device that generates IMU data based on measurement signals received from one or more of the position sensors 540. A position sensor 550 generates one or more measurement signals in response to motion of the HMD 510. Examples of position sensors 540 include: one or more accelerometers, one or more gyroscopes, one or more magnetometers, another suitable type of sensor that detects motion, a type of sensor used for error correction of the IMU 545, or some combination thereof. The position sensors 540 may be located external to the IMU 545, internal to the IMU 545, or some combination thereof.

Based on the one or more measurement signals from one or more position sensors 540, the IMU 545 generates IMU data indicating an estimated position of the HMD 510 relative to an initial position of the HMD 510. For example, the position sensors 540 include multiple accelerometers to measure translational motion (forward/back, up/down, left/right) and multiple gyroscopes to measure rotational motion (e.g., pitch, yaw, roll). In some embodiments, the IMU 545 rapidly samples the measurement signals and calculates the estimated position of the HMD 510 from the sampled data. For example, the IMU 545 integrates the measurement signals received from the accelerometers over time to estimate a velocity vector and integrates the velocity vector over time to determine an estimated position of a reference point on the HMD 510. Alternatively, the IMU 545 provides the sampled measurement signals to the console 520, which determines the IMU data. The reference point is a point that may be used to describe the position of the HMD 510. While the reference point may generally be defined as a point in space; however, in practice the reference point is defined as a point within the HMD 510 (e.g., a center of the IMU 545).

The IMU 545 receives one or more calibration parameters from the console 520. As further discussed below, the one or more calibration parameters are used to maintain tracking of the HMD 510. Based on a received calibration parameter, the IMU 545 may adjust one or more IMU parameters (e.g., sample rate). In some embodiments, certain calibration parameters cause the IMU 545 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 515 generates slow calibration data in accordance with calibration parameters received from the console 520. Slow calibration data includes one or more images showing observed positions of the locators 535 that are detectable by the imaging device 515. The imaging device 515 may include one or more cameras, one or more video cameras, any other device capable of capturing images including one or more of the locators 535, or some combination thereof. Additionally, the imaging device 515 may include one or more filters (e.g., used to increase signal to noise ratio). The imaging device 515 is designed to detect light emitted or reflected from locators 535 in a field of view of the imaging device 515. In embodiments where the locators 535 include passive elements (e.g., a retroreflector), the imaging device 515 may include a light source that illuminates some or all of the locators 535, which retro-reflect the light towards the light source in the imaging device 515. Slow calibration data is communicated from the imaging device 515 to the console 520, and the imaging device 515 receives one or more calibration parameters from the console 520 to adjust one or more imaging parameters (e.g., focal length, focus, frame rate, ISO, sensor temperature, shutter speed, aperture, etc.).

The haptic assembly 505 is a device that allows a user to send action requests to the console 520. An action request is a request to perform a particular action. For example, an action request may be to start or end an application or to perform a particular action within the application. The haptic assembly 505 also provides haptic feedback including a perception of contacting a virtual object. In one embodiment, the haptic assembly 505 includes a plurality of composable fluidic devices, such as the fluidic devices depicted in FIGS. 3A-4B, which may form one or more composite fluidic devices. The composite fluidic devices may be used to, e.g., address actuators included in the haptic assembly 505 according to the haptic feedback signal from the console 520. In one embodiment, as more fully described below in FIG. 6, the haptic assembly 505 is a haptic glove 600 through which the console 520 enables a user to interact with a virtual object. In a further embodiment, the haptic assembly 505 includes a controller 630 that is described below with regard to FIG. 6. As described below, in some embodiments, the controller 630 can include a plurality of composable fluidic devices, such as the fluidic devices depicted in FIGS. 3A-4B, which may form one or more composite fluidic devices.

In FIG. 5, the haptic assembly 505 further includes locators 550, one or more position sensors 555, and an inertial measurement unit (IMU) 560. In some embodiments, the locators 550, one or more position sensors 555, an inertial measurement unit (IMU) 560 are installed to determine a physical position or movement of the haptic assembly 505. In addition, the haptic assembly 505 receives, from the console 520, a haptic feedback signal corresponding to haptic feedback to the user. The haptic assembly 505 provides to the user with the haptic feedback of touching a virtual object in a virtual space, according to the haptic feedback signal. Specifically, the haptic assembly 505 prevents or enables a physical movement of a portion of a user in contact with the virtual object in the virtual space. For example, if a user's finger is in contact with a virtual object (e.g., a virtual wall) in a virtual space, the haptic assembly 505 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 505 to be actuated, and an amount of actuation of the position or the portion of the haptic assembly 505 for providing haptic feedback. In this embodiment, the amount of actuation is determined by, e.g., the console 520, according to a virtual position of the haptic assembly 505 corresponding to a physical position of the haptic assembly 505 and a virtual position of a virtual object in a virtual space. The haptic assembly 505 provides tactile perception of a user touching the virtual object according to the amount of actuation indicated by the haptic feedback signal.

The locators 550 are objects located in specific positions on the haptic assembly 505 relative to one another and relative to a specific reference point of the haptic assembly 505 on the haptic assembly 505. A locator 550 is substantially similar to a locator 535 except that a locator 550 is part of the haptic assembly 505. Additionally, in some embodiments, the outer surface or other portions of the haptic assembly 505 are opaque in the visible band of wavelengths of light. Thus, the locators 550 may emit light in the IR band under an outer surface that is transparent in the IR band but opaque in the visible band.

A position sensor 555 generates one or more measurement signals in response to motion of the haptic assembly 505. The position sensors 555 are substantially similar to the positions sensors 550, except that the position sensors 555 are part of the haptic assembly 505. The position sensors 555 may be located external to the IMU 560, internal to the IMU 560, or some combination thereof.

Based on the one or more measurement signals from one or more position sensors 555, the IMU 560 generates IMU data of the haptic assembly 505 indicating an estimated position of the haptic assembly 505 relative to an initial position of the haptic assembly 505. For example, the position sensors 555 include multiple accelerometers to measure translational motion (forward/back, up/down, left/right) and multiple gyroscopes to measure rotational motion (e.g., pitch, yaw, roll) of the haptic assembly 505. In some embodiments, the IMU 560 rapidly samples the measurement signals and calculates the estimated position of the haptic assembly 505 from the sampled data. For example, the IMU 560 integrates the measurement signals received from the accelerometers over time to estimate a velocity vector and integrates the velocity vector over time to determine an estimated position of a reference point of the haptic assembly 505. Alternatively, the IMU 560 provides the sampled measurement signals to the console 520, which determines the IMU data of the haptic assembly 505. The reference point of the haptic assembly 505 is a point that may be used to describe the position of the haptic assembly 505. While the reference point of the haptic assembly 505 may generally be defined as a point in space; however, in practice the reference point of the haptic assembly 505 is defined as a point within the haptic assembly 505 (e.g., a center of the IMU 560).

The IMU 560 receives one or more calibration parameters of the haptic assembly 505 from the console 520. As further discussed below, the one or more calibration parameters of the haptic assembly 505 are used to maintain tracking of the haptic assembly 505. Based on a received calibration parameter of the haptic assembly 505, the IMU 560 may adjust one or more IMU parameters (e.g., sample rate). In some embodiments, certain calibration parameters of the haptic assembly 505 cause the IMU 560 to update an initial position of the reference point of the haptic assembly 505 so it corresponds to a next calibrated position of the reference point of the haptic assembly 505. Updating the initial position of the reference point of the haptic assembly 505 as the next calibrated position of the reference point of the haptic assembly 505 helps reduce accumulated error associated with the determined estimated position.

The console 520 provides media to the HMD 510 for presentation to the user in accordance with information received from one or more of: the imaging device 515, the HMD 510, and the haptic assembly 505. In the example shown in FIG. 5, the console 520 includes an application store 565, a tracking module 570, and an engine 575. Some embodiments of the console 520 have different modules than those described in conjunction with FIG. 5. Similarly, the functions further described below may be distributed among components of the console 520 in a different manner than is described here.

The application store 565 stores one or more applications for execution by the console 520. An application is a group of instructions, that when executed by a processor, generates content for presentation to the user. Content generated by an application may be in response to inputs received from the user via movement of the HMD 510 or the haptic assembly 505. Examples of applications include: gaming applications, conferencing applications, video playback application, or other suitable applications.

The tracking module 570 calibrates the VR system 560 using one or more calibration parameters and may adjust one or more calibration parameters to reduce error in determination of the position of the HMD 510. For example, the tracking module 570 adjusts the focus of the imaging device 515 to obtain a more accurate position for observed locators on the HMD 510. Moreover, calibration performed by the tracking module 570 also accounts for information received from the IMU 545. Additionally, if tracking of the HMD 510 is lost (e.g., the imaging device 515 loses line of sight of at least a threshold number of the locators 535), the tracking module 570 re-calibrates some or all of the system environment 560.

The tracking module 570 tracks movements of the HMD 510 using slow calibration information from the imaging device 515. The tracking module 570 determines positions of a reference point of the HMD 510 using observed locators from the slow calibration information and a model of the HMD 510. The tracking module 570 also determines positions of a reference point of the HMD 510 using position information from the fast calibration information. Additionally, in some embodiments, the tracking module 570 may use portions of the fast calibration information, the slow calibration information, or some combination thereof, to predict a future location of the headset 510. The tracking module 570 provides the estimated or predicted future position of the HMD 510 to the engine 575.

The engine 575 executes applications within the system environment 560 and receives position information, acceleration information, velocity information, predicted future positions, or some combination thereof of the HMD 510 from the tracking module 570. Based on the received information, the engine 575 determines content to provide to the HMD 510 for presentation to the user. For example, if the received information indicates that the user has looked to the left, the engine 575 generates content for the HMD 510 that mirrors the user's movement in a virtual environment. Additionally, the engine 575 performs an action within an application executing on the console 520 in response to an action request received from the haptic assembly 505 and provides feedback to the user that the action was performed. The provided feedback may be visual or audible feedback via the HMD 510 or haptic feedback via the haptic assembly 505.

Figure 6:
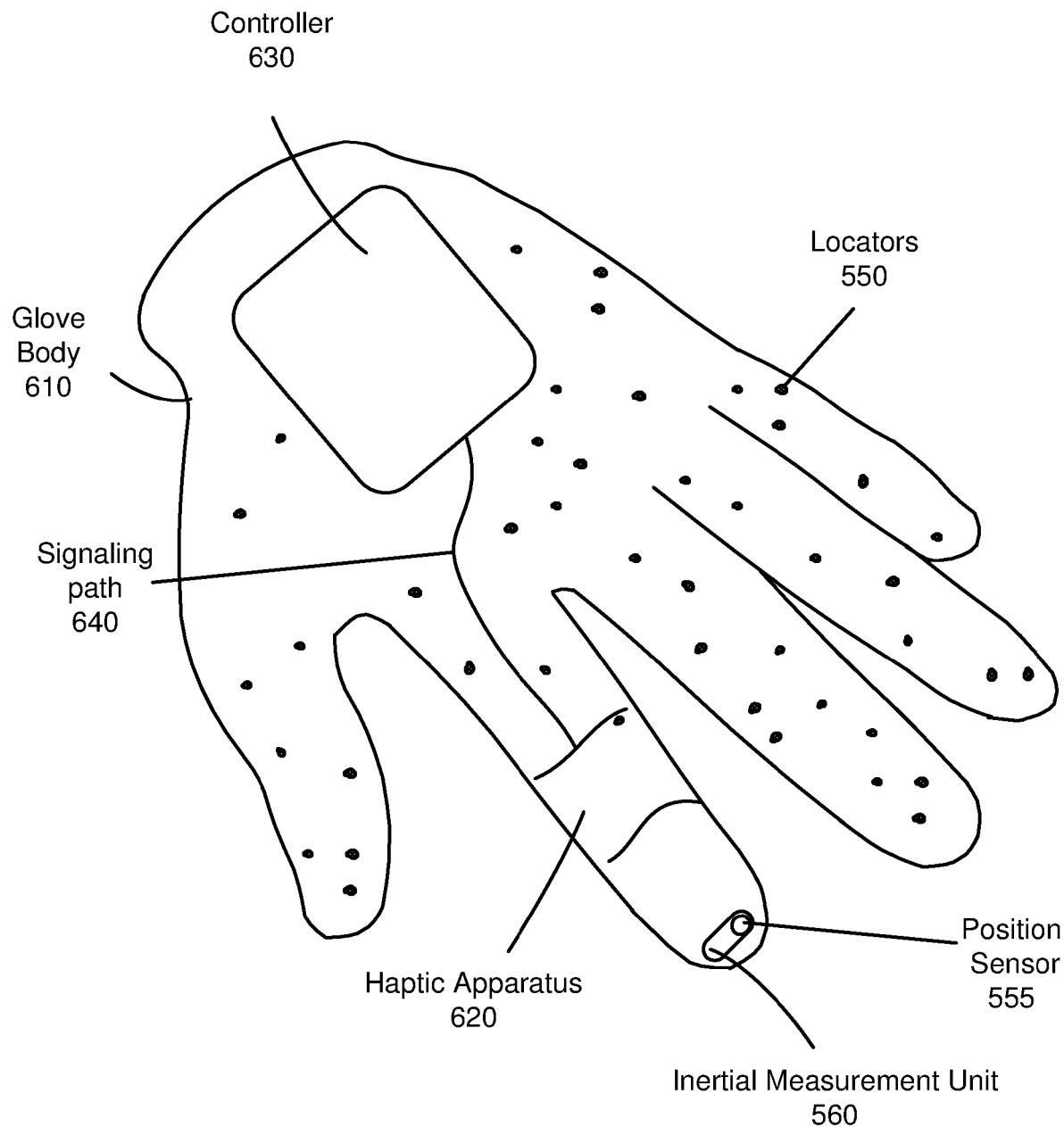
FIG. 6 is an example haptic glove for interacting with virtual objects, in accordance with an embodiment.

FIG. 6 is an example haptic glove 600 for interacting with virtual objects, in accordance with an embodiment. The haptic glove 600 shown in FIG. 6 includes a glove body 610, a haptic apparatus 620, a controller 630, a signaling path 640, one or more locators 550, a position sensor 555 and an IMU 560. Only one signaling path 640, one haptic apparatus 620, one position sensor 555 and one IMU 560 are shown in FIG. 6 to simplify the description. In alternative embodiments not shown, the haptic glove 600 can include multiple signaling paths, position sensors and haptic apparatus that are connected to the controller 630, for example, for each finger of the haptic glove 600, a set of haptic apparatus, position sensors and IMUs may be connected to the controller. Likewise, the functions performed by the various entities of the haptic glove 600 may differ in different embodiments. Additionally, the various entities of the haptic glove 600 may be positioned in different places on the glove body 610. As one example, additional haptic apparatuses 620 and the position sensors 555 are located at different parts of the glove body 610. As another example, the haptic apparatuses 620 are coupled to or wrap the entire fingers of the glove body 610. As another example, the controller 630 is coupled to a different portion of the glove body 610 corresponding to, for example a wrist or a palm.

The glove body 610 is an apparatus covering a hand, for example, a garment that is coupled to the position sensor 555, the haptic apparatus 620, the controller 630, and the signaling path 640. In one embodiment, the position sensor 555 is coupled to a corresponding finger of the glove body 610 (e.g., a portion corresponding to a fingertip of the glove body); the haptic apparatus 620 is coupled to a corresponding finger portion (e.g., a portion corresponding to a joint between two phalanges) of the glove body 610; and the controller 630 is coupled to a portion of the glove body 610 corresponding to a back of a hand (i.e., dorsal side). The signaling path 640 is coupled between the controller 630 and the haptic apparatus 620. In one embodiment, one or more of these components are placed beneath an outer surface of the glove body 610, thus are not visible from the outside. Additionally or alternatively, some of these components are placed on an outer surface of the glove body 610, and are visually detectable.

In one embodiment, the haptic glove 600 may be the haptic assembly 505 shown in FIG. 5 and the locators 550, the position sensor 555 and the IMU 560 of the haptic glove 600 may be the corresponding locators 550, position sensors 555 and IMUs 560 of the haptic assembly 505 shown in FIG. 5. A user's hand movement can be detected and tracked according to IMU data from the IMU 560 and/or slow calibration of the locators 550 from the imaging device 515. Moreover, haptic feedback including a perception of a user contacting a virtual object can be provided to the user by the controller 630, signaling path 640, and haptic apparatus 620.

The haptic apparatus 620 provides haptic feedback including a perception of a user touching a virtual object. In one embodiment, the haptic apparatus 620 is actuated according to instructions received from the controller 630. In one embodiment, the haptic apparatus 620 is coupled to a portion corresponding to a joint between two phalanges of the glove body 610. In another embodiment, the haptic apparatus 620 covers the entire glove body 610 or are placed on other parts (e.g., an area corresponding to a joint between two different fingers) of the glove body 610. The haptic apparatus 620 may be, for example, a plurality of actuators.

The controller 630 is a device that provides instructions for the haptic apparatus 620 to perform specific functions. The controller 630 may receive instructions or haptic feedback from the console 520 and actuates the haptic apparatus 620 accordingly. The controller 630 includes a plurality of fluidic devices, such as the fluidic devices depicted in FIGS. 3A-4B, which generate instructions for one or more haptic apparatuses (e.g., actuators). As discussed in detail above with regard to FIGS. 1, 2A-D, and 5, fluidic devices are composable and may be coupled together to form composite fluidic devices, like, e.g., a decoder. Decoders, for example, can help reduce a number of logical connections within the controller 630 and/or connections to the haptic apparatus 620. Accordingly, the controller 630 may be composed of a plurality of fluidic devices, including various combinations of those described above with regard to FIGS. 3A-4B.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
a first fluidic device coupled to a high pressure rail at a first pressure and a low pressure rail at a second pressure that is less than the first pressure, the first fluidic device comprising:
a first channel configured to transport a fluid from a first source to a first drain, wherein the first source is coupled to the high pressure rail and is an input that fluid enters the channel, and the first drain includes an output path for fluid in the first channel; and
a first gate configured to modulate a rate of fluid flow in the first channel by reducing a cross section of the first channel in accordance with logic instructions; and
a second fluidic device comprising:
a second channel configured to transport a fluid from a second source to a second drain, wherein the second source is an input that fluid enters the second channel, the second source is coupled to the high pressure rail, and the second drain includes an output path for fluid in the second channel; and
a second gate configured to modulate a rate of fluid flow in the second channel by reducing a cross section of the second channel in accordance with the logic instructions of the first gate,
wherein the device functionally is a NAND gate.

2. The device of claim 1, further comprising:
a third fluidic device comprising:
a third channel configured to transport a fluid from a third source to a third drain, wherein the third source is an input that fluid enters the third channel, and the third drain includes an output path for fluid in the third channel; and
a third gate configured to modulate a rate of fluid flow in the third channel by reducing a cross section of the third channel in accordance with logic instructions of the first gate and the second gate; and
a fourth fluidic device comprising:
a fourth channel configured to transport a fluid from a fourth source to a fourth drain, wherein the fourth source is an input that fluid enters the fourth channel, and the fourth drain includes an output path for fluid in the fourth channel; and a fourth gate configured to modulate a rate of fluid flow in the fourth channel by reducing a cross section of the fourth channel in accordance with logic instructions of the first gate, the second gate, and the third gate.

3. The device of claim 2, wherein the first drain is coupled to the second source, the second drain is coupled to the third source and the fourth source and wherein the device functionally is a NOR gate.

4. A device comprising:
a first fluidic device coupled to a high pressure rail at a first pressure and a low pressure rail at a second pressure that is less than the first pressure, the first fluidic device comprising:
a first channel configured to transport a fluid from a first source to a first drain, wherein the first source is coupled to the high pressure rail and is an input that fluid enters the channel, and the first drain includes an output path for fluid in the first channel; and
a first gate configured to modulate a rate of fluid flow in the first channel by reducing a cross section of the first channel in accordance with logic instructions; and
a second fluidic device comprising:
a second channel configured to transport a fluid from a second source to a second drain, wherein the second source is an input that fluid enters the second channel, and the second drain includes an output path for fluid in the second channel; and
a second gate configured to modulate a rate of fluid flow in the second channel by reducing a cross section of the second channel in accordance with the logic instructions of the first gate,
wherein the first drain is coupled to the second source and wherein the device functionally is a NOR gate.

5. A fluidic device comprising:
a gate comprised of at least one chamber whose volume expands with fluid pressure within the chamber causing a volume of the chamber to increase, wherein a high pressure state of the gate corresponds to a first chamber size, and a low pressure state of the gate corresponds to a second chamber size that is smaller than the first chamber size;
a channel configured to transport a fluid from a source to a drain, wherein the source is an input that fluid enters the channel, and the drain is an output for the fluid in the channel; and a wedge that controls a rate of fluid flow between the source and the drain in accordance with the fluid pressure within the gate, the wedge configured to induce a first flow rate of the fluid in the channel in accordance with the low pressure state of the gate and a second flow rate of the fluid in the channel in accordance with the high pressure state of the gate, the second flow rate greater than the first flow rate, wherein the gate comprises a first chamber and a second chamber, the first chamber located on a first lateral side of the wedge and the second chamber located on a second lateral side of the wedge opposite the first lateral side of the wedge.

6. The fluidic device of claim 5, further comprising a pre-loaded gate, wherein the wedge is located between the channel and the pre-loaded gate.

7. The fluidic device of claim 6, wherein the pre-loaded gate valve is fixed in place.

8. The fluidic device of claim 6, wherein the pre-loaded gate valve comprises a rigid material.

9. The fluidic device of claim 5, wherein the wedge comprises a first end and a second end, the first end located adjacent to the channel, a width of the wedge tapered such that a width of the first end is less than a width of the second end.

10. The fluidic device of claim 5, wherein the wedge is configured to control a rate of fluid flow in the channel based on a distance that the wedge protrudes into the channel.

11. The fluidic device of claim 10, wherein the wedge induces the first rate of fluid flow in the channel at a first distance of protrusion into the channel and the second rate of flow in the channel at a second distance of protrusion into the channel, the first distance of protrusion greater than the second distance of protrusion.

12. The fluidic device of claim 5, wherein the wedge is configured to move in a direction towards the channel in accordance with the low pressure state of the gate, thereby inducing the first flow rate of fluid in the channel.

13. The fluidic device of claim 5, wherein the wedge is configured to move in a direction away from the channel in accordance with the high pressure state of the gate, thereby inducing the second flow rate of the fluid in the channel.

14. The fluidic device of claim 5, wherein the fluidic device functionally is an inverter.

15. The fluidic device of claim 5, wherein the fluidic device functionally is a NOR gate.

16. The fluidic device of claim 5, wherein the fluidic device functionally is a NAND gate.

* * * * *

UNITED STATES PATENT AND TRADEMARK OFFICE
CERTIFICATE OF CORRECTION

PATENT NO. : 10,591,933 B1
APPLICATION NO. : 15/809450
DATED : March 17, 2020
INVENTOR(S) : Sean Jason Keller et al.

Page 1 of 1

It is certified that error appears in the above-identified patent and that said Letters Patent is hereby corrected as shown below:

On the Title Page

Item (57), Abstract, Line 3, delete "devices g" and insert -- devices (e.g., --, therefor.

In the Claims

In Column 21, Line 10, Claim 3, delete "fourth source" and insert -- fourth source, --, therefor.

In Column 21, Line 36, Claim 4, delete "source" and insert -- source, --, therefor.

Signed and Sealed this
Fifth Day of May, 2020

Andrei Iancu
*Director of the United States Patent and Trademark Office*